Figure 1:
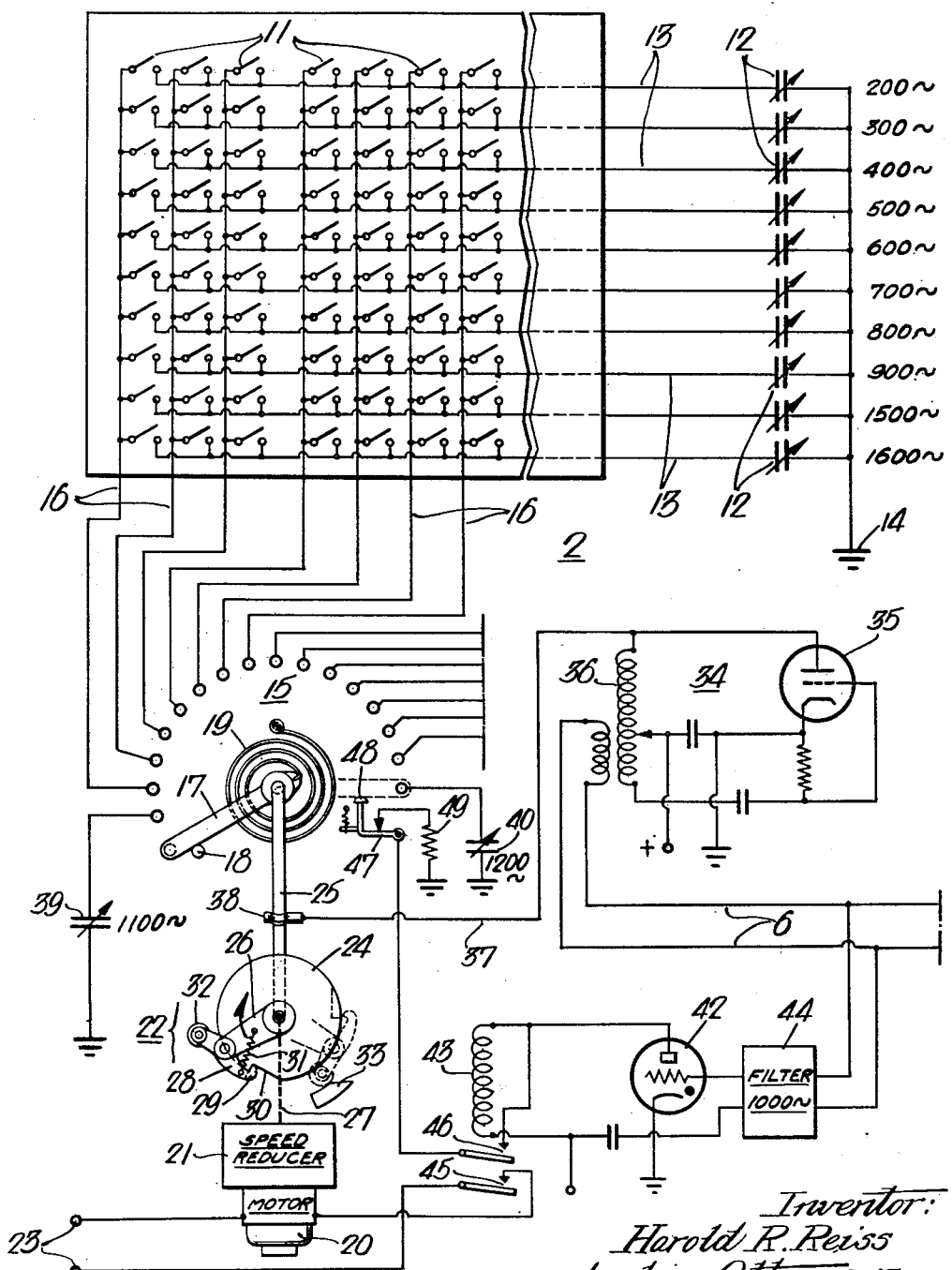

June 23, 1953 — H. R. REISS — 2,643,172
INFORMATION COLLECTING SYSTEM
Filed Jan. 25, 1950 — 2 Sheets-Sheet 1

Inventor:
Harold R. Reiss
by his Attorneys
Howson & Howson

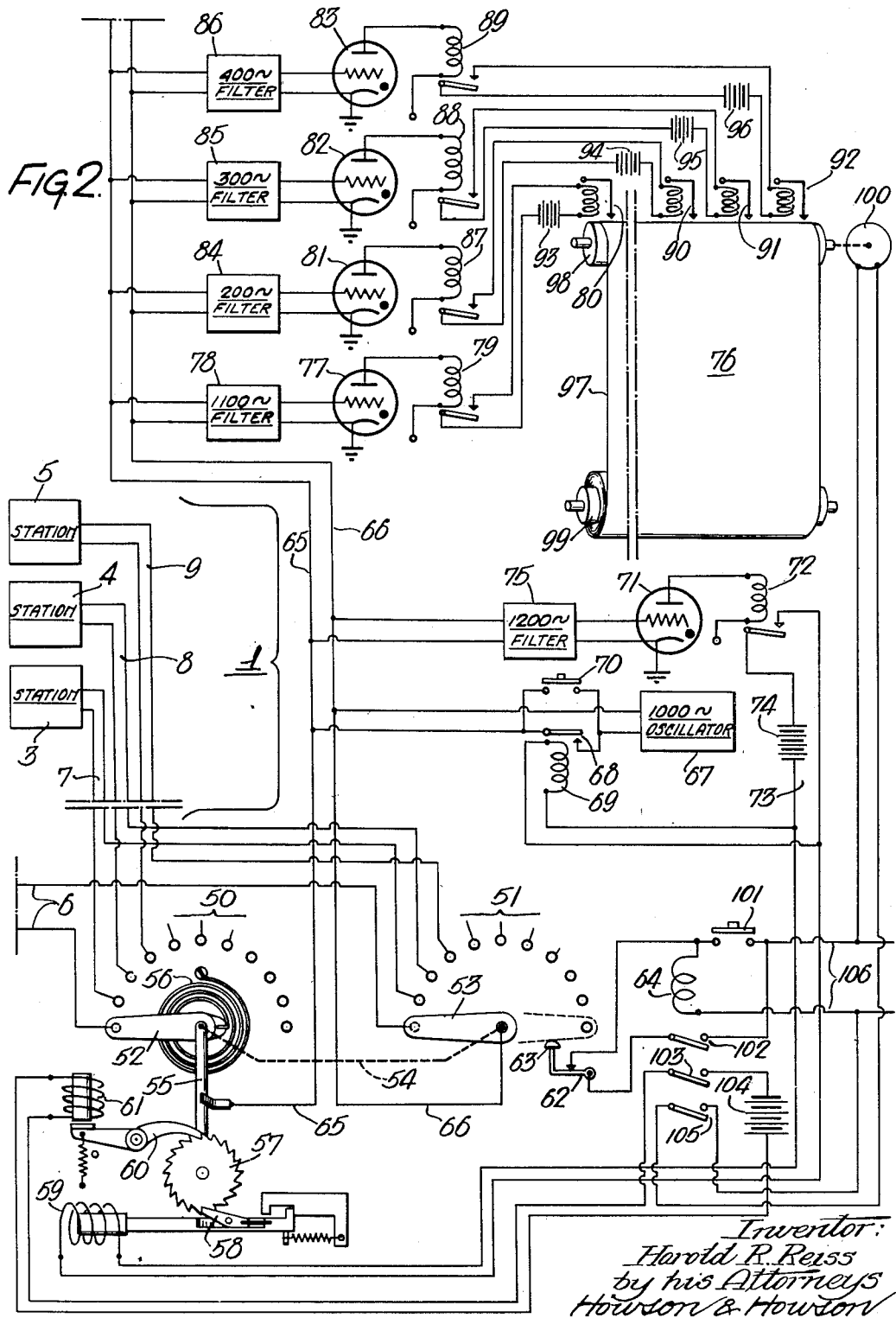

Patented June 23, 1953

2,643,172

UNITED STATES PATENT OFFICE 2,643,172

INFORMATION COLLECTING SYSTEM

Harold R. Reiss, Philadelphia, Pa.

Application January 25, 1950, Serial No. 140,449

11 Claims. (Cl. 346—33)

This invention relates to a system for obtaining information from a number of stations and for accumulating the information at a common or central station. Although the invention is capable of general application, it is intended particularly for use in obtaining from homes information which is greatly desired by those whose business it is to sell something to the public. By way of example, the invention may be utilized to obtain information regarding purchases of various products by a number of purchasers who are chosen to represent a "cross-section" of the buying public in a particular locality or geographical section. Since this is an important application of the invention, the invention will be described with particular reference to such application.

It is very important to manufacturers or producers of various products to know when a particular product is being purchased and how it is faring against competitive products. While a manufacturer can determine from his own sales records the quantity of a particular product sold over a period of time, he cannot determine from his records the day-to-day sales volume, nor can he determine how the product is faring against competition.

A number of methods have been employed in the past for obtaining information concerning the purchase of various products, but all of such methods have been cumbersome and generally unsatisfactory. One method has involved periodic inventory at stores which sell the products. Since many products as to which the information is desired are those commonly purchased by housewives and are sold largely in chain stores, this inventory method has been generally unsatisfactory due to the failure of such stores to cooperate. Another method has involved the keeping of purchase diaries by purchasers such as housewives and the periodic collection of information thus accumulated. This method is also unsatisfactory and impractical because of the reluctance or laxity on the part of the purchasers to keep accurate and day-to-day diaries. A third method has involved the periodic taking of inventories in the home, particularly with respect to products purchased from day-to-day by housewives. This method is expensive and it fails completely in respect to many fast-moving items. None of the aforementioned methods is practical from the standpoint of obtaining day-to-day information concerning the purchases of products by a "cross-section" of the buying public.

The primary object of the present invention is to provide a simple and practical system for the broad purpose of obtaining information from a number of stations, which system may be utilized to obtain from representative homes information such as that above mentioned.

By this invention there is provided a novel system wherein each station from which information is to be obtained is provided with an information storage means which can be easily used from day-to-day, and further means are provided by which the stored information can be collected at a central station by signal transmission and recorded at the central station, the latter means being controlled entirely from the central station.

The invention may be fully understood from the following detailed description with reference to the accompanying drawings wherein:

Fig. 1 is a diagrammatic illustration of a portion of a preferred embodiment of the invention; and Fig. 2 is a diagrammatic illustration of the remainder of said embodiment.

In considering the drawings, the two sheets should be placed side by side, with Fig. 1 at the left.

Referring more particularly to the drawings, there is represented in Fig. 2 at 1 a central station at which information is to be accumulated from various remote stations. The stations from which the information is to be obtained may be homes of families selected to represent a "cross-section" of the public in a particular locality. One such station is represented in detail in Fig. 1 at 2, while others are represented in Fig. 2 by blocks 3, 4 and 5. Signals indicative of the desired information are transmitted from stations 2 to 5 over transmission lines 6 to 9 to the central station 1. It will be understood that there may be any number of stations corresponding to station 2 and a corresponding number of transmission lines extending therefrom to the central station.

Referring to the station 2, which is illustrative of all of the various stations from which information is to be derived, there is provided at said station a manually operable information storage means 10 which may take the form of a board having thereon rows and columns of electric switches symbolically represented and designated generally by reference character 11. These switches may be of any suitable type for the purpose here contemplated. For example, each column may be a bank of latch-type push button switches only one of which will latch in at a time and having a common release mechanism, as well known in the electrical arts. For the purpose of the present disclosure, it may be assumed that the information desired comprises brand names and purchase prices of commodities purchased by the family at a particular home station. In the drawing illustration, the switches shown are arranged in two sections to cover different price ranges, but this is merely illustrative. Referring to the left hand section, which comprises three vertical columns of switches, the first column may represent product brands, while the other two columns may represent prices from 1¢ to 99¢. In the right hand section, which comprises four columns of switches, the first column may represent product brands, while the other three columns may represent prices from 1¢ up to $9.99. Thus, in order to store the desired information concerning the purchase of a particular product the purchaser has only to close the proper switches. It will be understood, of course, that the foregoing is merely by way of example, and that the switches may be arranged to represent any desired information.

The horizontal rows of switches are connected as shown to condensers 12 by means of conductors 13, the condensers being connected to ground at 14. The vertical columns of switches are connected as shown to stationary contacts of a selector switch 15 by means of conductors 16. The selector switch is a conventional self-returning selector switch whose wiper arm 17 is normally maintained in home position against a stop 18 by means of a spring 19 which also serves to return said arm to the home position. An electric motor 20 serves to drive arm 17 through a suitable speed reducing unit 21 and a one-way clutch device 22 to effect predetermined slow motion of arm 17 whenever the motor is energized. The energizing circuit 23 of said motor is controlled in a manner which will be hereinafter described.

The clutch device 22 may comprise a disk fixed to the shaft 25 carrying arm 17, an arm 26 mounted on the drive shaft represented at 27, a pawl 28 pivotally mounted on arm 26 and having a hook end 29 engageable in a notch 30 of said disk, and a spring 31 promoting such engagement. At the opposite end of said pawl is a roller 32 adapted to engage a fixed cam 33 when arm 26 is driven clockwise to a certain extent. With such arrangement the disk 24 is driven until the pawl 28 is disengaged therefrom by the action of cam 33, at which time the arm 17 is freed so that it may be returned to home position by its spring 19.

Cooperatively associated with the selector switch 15 is an oscillator 34 of conventional form. This oscillator includes an electron tube 35 and a tank coil 36 with which various capacitances may be associated to effect operation of the oscillator at different frequencies. The plate end of the tank coil 36 is electrically connected to switch arm 17 by means of conductor 37 which extends to a wiping connection 38 associated with shaft 25. The first stationary contact of the selector switch 15 is connected to one side of a condenser 39 whose other side is grounded. The last stationary contact of the selector switch 15 is connected to one side of a condenser 40 whose other side is grounded.

It will be seen from the foregoing description that during a single cycle of operation of the selector switch 15, different condensers will be connected successively to the tank coil 36 of the oscillator 34. However, it should be noted that the connection of condensers 12 depends upon the condition of switches 11. The various condensers are adjusted to give different frequencies of operation of the oscillator 34. By way of example, the condensers 39 and 40 may be adjusted to give operating frequencies of 1100 and 1200 cycles respectively, and the condensers 12 may be adjusted so that they will give various other different operating frequencies. Commencing with the uppermost one of the condensers 12 these condensers may be adjusted to give the following operating frequencies: 200, 300, 400, 500, 600, 700, 800, 900, 1500, and 1600. The different signals produced by the oscillator 34 during a cycle of operation of the selector switch 15 are supplied to the transmission line 6 through the coil 41 which is inductively coupled to the coil 36. The specific functions of the signals will be apparent later.

The driving motor 20 for the selector switch 15 is controlled by an electron tube 42 and an associated relay 43 whose operating winding is connected in the plate circuit of the tube. The tube may be a thyratron as illustrated, in which case it may be A. C. operated, or it may be a vacuum tube. A filter 44 is included in the input of the thyratron 42 so as to supply thereto a signal of a particular frequency, e. g. 1000 cycles, which is transmitted over line 6 from the central station as hereinafter described. Contacts 45 of relay 43 serve to control the energizing circuit 23 of motor 20. Contacts 46 of the same relay are included in a holding circuit for the relay, which circuit also includes a normally closed switch 47 associated with the selector switch 15. The switch 47 has an operating element 48 which is engaged by the arm 17 when the latter reaches the end of its travel. A current limiting resistor 49 is connected between switch 47 and ground. The purpose of this arrangement is to deenergize the relay 43 and thus deenergize the motor 20 when the arm 17 reaches the end of its travel.

Referring now to the central station 1 (Fig. 2), there is provided at said station a two-section step-by-step selector switch comprising sections 50 and 51 whose movable arms 52 and 53 are ganged as indicated by the dotted line 54. These arms may be mounted on a common shaft 55, and the dotted line 54 may be considered as representing a portion of said shaft extending between the switch sections. The selector switch is actuated, against the action of its homing spring 56, by means of a ratchet wheel 57 and a stepping pawl 58 actuated by a stepping coil 59. A holding pawl 60 is spring biased toward inoperative position but is held in engagement with the ratchet wheel by holding coil 61. Release of the holding pawl is effected by means of a switch 62 having an operating element 63 which is engaged by arm 53 when the latter reaches the end of its travel. In the illustrated arrangement switch 62 is included in a holding circuit of a relay 64 which controls energization of the holding coil as hereinafter described.

The lines 6, 7, etc. are connected to successive stationary contacts of the switch sections 50 and 51 as illustrated. The wiper arms 52 and 53 step from one line to the next during operation of the system as hereinafter described.

Connected to the wiper arms 52 and 53 are a pair of conductors 65 and 66, to which various devices are connected as now to be described. An oscillator 67 is connected to conductors 65, 66 through contacts 68 of a relay 69. The frequency of this oscillator, e. g. 1000 cycles, corresponds to the pass frequency of the filter 44. The purpose of this oscillator is to supply an operating signal to the thyratron 42. A starting switch 70 is connected in shunt relation with the relay contacts 68.

A tube 71, which may be an A. C. operated thyratron but could be a vacuum tube, and an associated relay 72 serve to control an energizing circuit 73 which is common to the stepping coil 59 and the winding of relay 69, the latter two elements being connected in parallel relation. A suitable source of electrical energy, as represented by battery 74, is included in the circuit 73. The thyratron 71 has its input connected to conductors 65, 66 through a filter 75. This filter passes only a signal having the frequency for which condenser 40 is adjusted, e. g. 1200 cycles.

Also connected to conductors 65, 66 are a number of tubes, which may be A. C. operated thyratrons but could be vacuum tubes, and which control printing recorders of the recording apparatus 76. Thyratron 77 is connected to conductors 65, 66 through an input filter 78 which is adapted to pass only a signal having a frequency corresponding to the setting of condenser 39, e. g. 1100 cycles. The thyratron 77 controls a relay 79 which, in turn, controls the printing recorder 80.

Other thyratrons are provided corresponding in number to condensers 12, each thyratron having an associated input filter having a single pass frequency corresponding to the setting of one of said condensers. By way of example, three of these thyratrons are shown at 81, 82 and 83, and their associated filters are shown at 84, 85 and 86, these filters having pass frequencies of 200 cycles, 300 cycles and 400 cycles, respectively. The thyratrons 81, 82 and 83 control relays 87, 88 and 89 which control printing recorders 90, 91 and 92. Due to space limitation, the other thyratrons and the associated filters, relays and printing recorders are not shown.

It is necessary, of course, to supply energy to the printing recorders. For simplicity of illustration, batteries 93 to 96 are shown in the respective recorder circuits.

The recording apparatus comprises a common record tape or sheet 97 moving between rolls 98 and 99, roll 99 being driven by motor 100. The printing recorders are arranged transversely of the tape or sheet as shown.

As mentioned above, the relay 64 controls enerization of the holding coil 61, and the same relay may control energization of motor 100. Momentary closure of push-button switch 101 causes relay 64 to pick up and lock itself in through contacts 102 and switch 62. Closure of contacts 103 energizes the holding coil 61 from a source such as battery 104. Closure of contacts 105 energizes motor 100 from line 106. When the switch 62 opens, the relay drops out and causes deenergization of both the holding coil and the motor.

Considering the system as a whole, normally the system is inoperative and during the course of a time interval, such as a day, the persons at the various remote stations, of which station 2 is illustrative, store the desired information in the manner hereinbefore described. At the end of each day, the system may be operated to collect the information and record it at the central station. To do so the operator at the central station momentarily depresses the push button switches 70 and 101. The recorder motor starts and a signal is sent from the oscillator 67 to the thyratron 42 which momentarily energizes relay 43. The latter is held energized by its holding circuit. The motor 20 is energized by the closure of contacts 45 and commences to drive the selector switch 15. The wiper arm 17 first engages the contact which is connected to condenser 39, and this causes the oscillator 34 to send a certain signal, e. g. 1100 cycles, to the central station, which signal is effective to operate thyratron 77. Consequently the recorder 80 places a mark on the record sheet 97, which mark indicates the start of the recording of the information from station 2. As the wiper arm 17 of selector switch 15 proceeds in its movement, successive different frequency signals are transmitted to the central station and are selectively received by the thyratrons 81, 82 etc. The latter cause selective operation of the associated recorders which place marks in different transverse positions on the recording sheet 97 indicative of the information represented by the transmitted signals. Since the recording sheet is moving coincidently with the movement of wiper arm 17, the marks will be placed on the sheet in different longitudinal positions. The position of each mark, both laterally and longitudinally, will serve to indicate the information represented thereby. Of course, the recording sheet may be marked to facilitate the reading of the information.

When the wiper arm 7 engages the contact to which condenser 40 is connected, a signal of certain frequency, e. g. 1200 cycles, is transmitted to the central station and is received by the thyratron 71. The latter briefly energizes relay 72 which causes an impulse to be supplied to stepping coil 59, thus causing the dual selector switch 50, 51 to step from line 6 to line 7. At the same time the brief energization of relay 69 causes a starting signal to be sent over line 7 to the station at the other end of said line. Relay 69 should have delay operating characteristics so that it will only send the starting signal over the newly selected line. In the meantime the wiper arm 17 of selector switch 15 opens switch 47 thereby opening the holding circuit of relay 43. Consequently motor 20 is deenergized and the wiper arm 17 returns to its home position.

With line 7 connected to the equipment at the central station, the system goes through the same cycle of operation, and this is repeated for each of the stations successively. When the wiper arms 52 and 53 of the selector switch 50, 51 reach the end of their travel, switch 62 is opened and relay 64 drops out, the selector switch returns to its normal or home position, and the system ceases to operate.

It has been stated above that the tubes 42, 71, 77, 81, 82, etc. may be vacuum tubes instead of thyratrons. In such case, the vacuum tubes could be grid-controlled rectifiers.

While a particular embodiment of the invention has been illustrated and described, the invention is not limited thereto but is capable of various other embodiments.

I claim:

1. In a system for recording at a central station information from a number of remote stations, manually-operable information storing means at each of said remote stations, selector switch means at each of said remote stations arranged to select the stored information items, means connected to said information storing means controllable by said selector switch means for producing signals indicative of the stored information items, transmission lines extending from said remote stations to said central station to transmit said signals, selector switch means at the central station for selecting each of said lines, means for effecting operation of said last-mentioned selector switch means under control of the selector switch means at the remote stations, and means at the central station responsive to said signals for recording said information.

2. In a system for recording at a central station information from a number of remote stations, manually-operable information storing means at each of said remote stations, a selector switch at each of said remote stations arranged to select the stored information items, a transmission line extending from each of said remote stations to the central station, means connected to said information storing means controllable by said selector switch for supplying to said line signals indicative of the stored information items, a driving motor for said selector switch, an energizing circuit for said motor, signal-responsive means connected to said line for controlling said circuit, means at the central station for applying to said line a control signal to which said last-recited means is responsive, selector switch means at the central station for selecting the lines extending from the remote stations, means for effecting operation of said selector switch means under control of the selector switches at said remote stations, and means at the central station responsive to the first-mentioned signals for recording the information of which such signals are indicative.

3. In a system for recording at a central station information from a number of remote stations, manually-operable information storing means at each of said remote stations, selector switch means at each of said remote stations arranged to select the stored information items, means connected to said information storing means controllable by said selector switch means for producing signals of different frequencies indicative of the stored information items, transmission lines extending from said remote stations to said central station to transmit said signals, selector switch means at the central station for selecting each of said lines, means for effecting operation of said last-mentioned selector switch means under control of the selector switch means at the remote stations, recording apparatus at the central station including a plurality of signal-operable recording means, and frequency-responsive means for selectively supplying said signals to said recording means.

4. In a system for recording at a central station information from a number of remote stations, manually-operable information storing means at each of said remote stations, a selector switch at each of said remote stations arranged to select the stored information items, a transmission line extending from each of said remote stations to the central station, means connected to said information storing means controllable by said selector switch for supplying to said line signals of different frequencies indicative of the stored information items, a driving motor for said selector switch, an energizing circuit for said motor, signal-responsive means connected to said line for controlling said circuit, means at the central station for applying to said line a control signal to which said last-recited means is responsive, selector switch means at the central station for selecting the lines extending from the remote stations, means for effecting operation of said selector switch means under control of the selector switches at said remote stations, recording apparatus at the central station including a plurality of signal-operable recording means, and frequency-responsive means for selectively supplying the first-mentioned signals to said recording means.

5. In a system for recording at a central station information from a number of remote stations, manually-operable information storing means at each of said remote stations, a selector switch at each of said remote stations arranged to select the stored information items, means connected to said information storing means controllable by said selector switch for producing signals of different frequencies indicative of the stored information items, transmission lines extending from said remote stations to said central station to transmit said signals, selector switch means at the central station for selecting each of said lines, recording apparatus at the central station including a plurality of signal-operable means for marking a record, means controlled by said selector switch for supplying initially to said line a signal of distinct frequency, frequency-responsive means for supplying the latter signal to one of said marking means to record a mark indicating start of recording relative to a particular remote station, and frequency-responsive means for selectively supplying the first-mentioned signals to the others of said marking means.

6. In a system for recording at a central station information from a number of remote stations, manually-operable information storing means at each of said remote stations, a selector switch at each of said remote stations arranged to select the stored information items, a transmission line extending from each of said remote stations to the central station, means connected to said information storing means controllable by said selector switch for supplying to said line signals of different frequencies indicative of the stored information items, a driving motor for said selector switch, an energizing circuit for said motor, signal-responsive means connected to said line for controlling said circuit, means at the central station for applying to said line a control signal to which said last-recited means is responsive, selector switch means at the central station for selecting the lines extending from the remote stations, means for effecting operation of said selector switch means under control of the selector switches at said remote stations, recording apparatus at the central station including a plurality of signal-operable means for marking a record, means controlled by said selector switch for supplying initially to said line a signal of distinct frequency, frequency-responsive means for supplying the latter signal to one of said marking means to record a mark indicating start of recording relative to a particular remote station, and frequency-responsive means for selectively supplying the first-mentioned signals to the others of said marking means.

7. In a system for recording at a central station information from a number of remote stations, manually-operable information storing means at each of said remote stations, said storing means comprising a plurality of selectively closable electric switches arranged to be representative of information, an oscillator at each remote station operable at different frequencies, a plurality of frequency-determining elements connected to said switches so as to be selectable thereby, a selector switch at each remote station connected to said switches and to said oscillator so as to connect selected ones of said elements successively to said oscillator, whereby the latter is caused to produce signals of different frequencies indicative of the stored information, a transmission line extending from each remote station to the central station to transmit said signals, a driving motor for said selector switch, an energizing circuit for said motor, signal-responsive means connected to said line for controlling said circuit, means at the central station for applying to said line a control signal to which said last-recited means is responsive, selector switch means at the central station for selecting the lines extending from the remote stations, means for effecting operation of said selector switch means under control of the selector switches at said remote stations, recording apparatus at the central station including a plurality of signal operable recording means, and frequency-responsive means for selectively supplying the first-mentioned signals to said recording means.

8. In a system for recording at a central station information from a number of remote stations, manually-operable information storing means at each of said remote stations, said storing means comprising a plurality of selectively closable electric switches arranged to be representative of information, an oscillator at each remote station operable at different frequencies, a plurality of frequency-determining elements connected to said switches so as to be selectable thereby, a selector switch at each remote station connected to said switches and to said oscillator so as to connect selected ones of said elements successively to said oscillator, whereby the latter is caused to produce signals of different frequencies indicative of the stored information, a transmission line extending from each remote station to the central station to transmit said signals, a driving motor for said selector switch, an energizing circuit for said motor, signal-responsive means connected to said line for controlling said circuit, means at the central station for applying to said line a control signal to which said last-recited means is responsive, selector switch means at the central station for selecting the lines extending from the remote stations, means for effecting operation of said selector switch means under control of the selector switches at said remote stations, recording apparatus at the central station including a plurality of signal-operable means for marking a record, means controlled by said selector switch for supplying initially to said line a signal of distinct frequency, frequency-responsive means for supplying the latter signal to one of said marking means to record a mark indicating start of recording relative to a particular remote station, and frequency-responsive means for selectively supplying the first-mentioned signals to the others of said marking means.

9. In a system for recording at a central station information from a number of remote stations, manually-operable information storing means at each of said remote stations, a selector switch at each of said remote stations arranged to select the stored information items, a transmission line extending from each of said remote stations to the central station, means connected to said information storing means controllable by said selector switch for supplying to said line signals of different frequencies indicative of the stored information items, a driving motor for said selector switch, an energizing circuit for said motor, signal-responsive means connected to said line for controlling said circuit, means at the central station for applying to said line a control signal to which said last-recited means is responsive, selector switch means including a stepping coil at the central station for selecting the lines extending from the remote stations, recording apparatus at the central station including a plurality of signal-operable recording means, frequency-responsive means for selectively supplying the first-mentioned signals to said recording means, means including a relay at said central station for energizing said stepping coil, means rendered operable by said selector switch at the end of its operation to supply to said line a signal of distinct frequency, and frequency-responsive means for supplying the latter signal to said relay.

10. In a system for recording at a central station information from a number of remote stations, manually-operable information storing means at each of said remote stations, a selector switch at each of said remote stations arranged to select the stored information items, a transmission line extending from each of said remote stations to the central station, means connected to said information storing means controllable by said selector switch for supplying to said line signals of different frequencies indicative of the stored information items, a driving motor for said selector switch, an energizing circuit for said motor, signal-responsive means connected to said line for controlling said circuit, means at the central station for applying to said line a control signal to which said last-recited means is responsive, selector switch means including a stepping coil at the central station for selecting the lines extending from the remote stations, recording apparatus at the central station including a plurality of signal-operable recording means, frequency responsive means for selectively supplying the first-mentioned signals to said recording means, means including a relay at said central station for energizing said stepping coil, means rendered operable by said selector switch at the end of its operation to supply to said line a signal of distinct frequency, frequency-responsive means for supplying the latter signal to said relay, and means operable by said selector switch at the end of its operation to effect deenergization of said motor.

11. In a system for recording at a central station information from a number of remote stations, manually-operable information storing means at each of said remote stations, selector switch means at each of said remote stations arranged to select the stored information items, means connected to said information storing means controllable by said selector switch means for producing signals indicative of the stored information items, transmission lines extending from said remote stations to said central station to transmit said signals, selector switch means at the central station for selecting each of said lines, means operable by the selector switch means at each remote station to send a control signal over the connected line after all of the information signals have been transmitted from that remote station, means responsive to said control signal for actuating the selector switch means at the central station to select the transmission line of a different remote station, and means at the central station responsive to the information signals from the remote stations for recording the information of which such signals are indicative.

HAROLD R. REISS.

References Cited in the file of this patent

UNITED STATES PATENTS

| Number | Name | Date |
|---|---|---|
| 1,786,805 | Wensley | Dec. 30, 1930 |
| 1,945,666 | Stewart | Feb. 6, 1934 |
| 2,401,729 | Goldsmith | June 11, 1946 |
| 2,427,670 | Goldsmith | Sept. 23, 1947 |
| 2,465,976 | Goldsmith | Mar. 29, 1949 |
| 2,466,804 | Giffen et al. | Apr. 12, 1949 |
| 2,477,973 | Evers | Aug. 2, 1949 |
| 2,488,508 | Goldsmith | Nov. 15, 1949 |
| 2,502,654 | Keyes | Apr. 4, 1950 |
| 2,522,453 | Keyes | Sept. 12, 1950 |